US008013839B2

(12) United States Patent
Ording et al.

(10) Patent No.: US 8,013,839 B2
(45) Date of Patent: *Sep. 6, 2011

(54) METHODS FOR DETERMINING A CURSOR POSITION FROM A FINGER CONTACT WITH A TOUCH SCREEN DISPLAY

(75) Inventors: Bas Ording, San Francisco, CA (US); Scott Forstall, Mountain View, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/957,185

(22) Filed: Nov. 30, 2010

(65) Prior Publication Data

US 2011/0074677 A1   Mar. 31, 2011

Related U.S. Application Data

(63) Continuation of application No. 11/850,015, filed on Sep. 4, 2007, now Pat. No. 7,843,427.

(60) Provisional application No. 60/937,993, filed on Jun. 29, 2007, provisional application No. 60/946,716, filed on Jun. 27, 2007, provisional application No. 60/879,469, filed on Jan. 8, 2007, provisional application No. 60/879,253, filed on Jan. 7, 2007, provisional application No. 60/824,769, filed on Sep. 6, 2006.

(51) Int. Cl.
*G06F 3/033* (2006.01)
*G09G 5/08* (2006.01)

(52) U.S. Cl. ................ 345/157; 345/173; 715/858

(58) Field of Classification Search .......... 345/173–178, 345/157; 178/18.01–18.09, 18.11; 715/810, 715/856–862

See application file for complete search history.

(56) References Cited

U.S. PATENT DOCUMENTS

| 5,627,567 | A | 5/1997 | Davidson ................ 345/173 |
| 5,740,390 | A | 4/1998 | Pickover et al. ............ 395/348 |
| 5,748,512 | A | 5/1998 | Vargas .................. 364/709.12 |
| 5,757,358 | A | 5/1998 | Osga ..................... 345/146 |
| 5,805,165 | A | 9/1998 | Thorne, III et al. ......... 345/348 |

(Continued)

FOREIGN PATENT DOCUMENTS

EP   1 271 295 A2   1/2003

(Continued)

OTHER PUBLICATIONS

Centroid, Apr. 28, 2006, 1 page, http://faculty.evansville.edu/ck6/tcenters/class/centroid.html.

(Continued)

*Primary Examiner* — Stephen Sherman
(74) *Attorney, Agent, or Firm* — Morgan, Lewis & Bockius LLP

(57) ABSTRACT

A portable device with a touch screen display detects a contact area of a finger with the touch screen display and then determines a first position associated with the contact area. The cursor position of the finger contact is determined, at least in part, based on: the first position, one or more distances between the first position and one or more of the user interface objects; and one or more activation susceptibility numbers, each associated with a respective user interface object in the plurality of user interface objects. If the cursor position falls into the hidden hit region of a virtual push button on the touch screen display, the portable device is activated to perform operations associated with the virtual push button.

21 Claims, 10 Drawing Sheets

U.S. PATENT DOCUMENTS

| | | | | |
|---|---|---|---|---|
| 5,825,352 | A | 10/1998 | Bisset et al. | 345/173 |
| 5,877,751 | A | 3/1999 | Kanemitsu et al. | 345/173 |
| 5,963,671 | A | 10/1999 | Comerford et al. | 382/230 |
| 6,049,326 | A | 4/2000 | Beyda et al. | 345/157 |
| 6,104,384 | A | 8/2000 | Moon et al. | 345/168 |
| 6,259,436 | B1 | 7/2001 | Moon et al. | 345/173 |
| 6,278,443 | B1 | 8/2001 | Amro et al. | 345/173 |
| 6,411,283 | B1 | 6/2002 | Murphy | 345/173 |
| 6,567,109 | B1 | 5/2003 | Todd | 345/862 |
| 6,643,524 | B1 | 11/2003 | Ishii et al. | 455/560 |
| 6,938,220 | B1 | 8/2005 | Shigematsu et al. | 715/863 |
| 7,277,088 | B2 | 10/2007 | Robinson et al. | 345/173 |
| 7,352,365 | B2 | 4/2008 | Trachte | 345/173 |
| 7,489,306 | B2 | 2/2009 | Kolmykov-Zotov et al. | 345/173 |
| 7,605,804 | B2 | 10/2009 | Wilson | 345/173 |
| 2002/0051018 | A1 | 5/2002 | Yeh | 345/784 |
| 2003/0063073 | A1 | 4/2003 | Geaghan et al. | 345/173 |
| 2004/0136564 | A1 | 7/2004 | Roeber et al. | 382/100 |
| 2004/0155869 | A1 | 8/2004 | Robinson et al. | 345/168 |
| 2004/0183833 | A1 | 9/2004 | Chua | 345/773 |
| 2005/0116927 | A1 | 6/2005 | Voelckers | 345/157 |
| 2005/0190970 | A1 | 9/2005 | Griffin | 382/209 |
| 2006/0007174 | A1 | 1/2006 | Shen | 345/173 |
| 2006/0085757 | A1 | 4/2006 | Andre et al. | 715/771 |
| 2006/0161871 | A1 | 7/2006 | Hotelling et al. | 715/863 |
| 2007/0247442 | A1 | 10/2007 | Andre et al. | 345/173 |
| 2007/0247446 | A1 | 10/2007 | Orsley et al. | 345/184 |
| 2007/0260987 | A1 | 11/2007 | Mohoney et al. | 715/723 |
| 2009/0284471 | A1 | 11/2009 | Longe et al. | 345/168 |

FOREIGN PATENT DOCUMENTS

| | | | |
|---|---|---|---|
| EP | 1 569 079 | A1 | 8/2005 |
| EP | 1 674 976 | A2 | 6/2006 |
| GB | 2 351 639 | A | 1/2001 |
| JP | 10-307673 | | 11/1998 |
| JP | 2004 280590 | A | 10/2004 |
| JP | 2004 341813 | A | 12/2004 |
| WO | WO 00/38042 | A1 | 6/2000 |

OTHER PUBLICATIONS

Centroid, Apr. 28, 2006, 3 pages, http://www.pballew.net/centroid.html.

International Search Report and Written Opinion dated Jun. 13, 2008, received in International Application No. PCT/US2008/050426, which corresponds to U.S. Appl. No. 11/969,796.

International Search Report and Written Opinion dated Jan. 10, 2008, received in International Application No. PCT/US2007/077645, which corresponds to U.S. Appl. No. 11/850,015.

Office Action dated Nov. 1, 2010, received in Chinese Patent Application No. 200880007119.4, which corresponds to U.S. Appl. No. 11/969,796.

Office Action dated Dec. 7, 2009, received in European Patent Application No. 08 727 399.1, which corresponds to U.S. Appl. No. 11/969,796.

Office Action dated Jun. 7, 2010, received in. U.S. Appl. No. 11/850,015.

Notice of Allowance dated Sep. 27, 2010, received in U.S. Appl. No. 11/850,015.

Office Action dated Feb. 18, 2010, received in Australian Patent Application No. 2007292384, which corresponds to U.S. Appl. No. 11/850,015.

Office Action dated Jun. 10, 2010, received in Chinese Application for Invention No. 200780040508.2, which corresponds to U.S. Appl. No. 11/850,015.

Office Action dated Jun. 7, 2010, received in German Patent Application No. 11 2007 002 088.1-53, which corresponds to U.S. Appl. No. 11/850,015.

Office Action dated Feb. 16, 2010, received in European Patent Application No. 07 814 691.7, which corresponds to U.S. Appl. No. 11/850,015.

Communication under Rule 71(3)—Intention to grant a European Patent dated Nov. 8, 2010, received in European Patent Application No. 07 814 691.7, which corresponds to U.S. Appl. No. 11/850,015.

Office Action dated Mar. 19, 2009, received in U.S. Appl. No. 11/228,737.

Office Action dated Oct. 19, 2009, received in U.S. Appl. No. 11/228,737.

Office Action dated Feb. 23, 2010, received in U.S. Appl. No. 11/228,737.

Notice of Allowance dated Sep. 7, 2010, received in U.S. Appl. No. 11/228,737.

Office Action dated Sep. 8, 2009 received in Australian Patent Application No. 2006291338, which corresponds to U.S. Appl. No. 11/228,737.

Office Action dated Oct. 5, 2010, received in Australian Patent Application No. 2006291338, which corresponds to U.S. Appl. No. 11/228,737.

Office Action dated Oct. 23, 2009, received in Chinese Patent Application No. 200680033988.5, which corresponds to U.S. Appl. No. 11/228,737.

Office Action dated Nov. 24, 2010, received in Chinese Patent Application No. 200680033988.5, which corresponds to U.S. Appl. No. 11/228,737.

Office Action dated Oct. 14, 2008, received in the European Patent Application No. 06 789 731.4, which corresponds to U.S. Appl. No. 11/228,737.

Office Action dated Dec. 11, 2009, received in U.S. Appl. No. 11/696,703.

Final Office Action dated Jul. 6, 2010, received in U.S. Appl. No. 11/696,703, 11 pages.

Notice of Allowance dated Oct. 20, 2010, received in U.S. Appl. No. 11/696,703.

European Search Report dated May 16, 2011, received in European Patent Application No. 11154035.7, which corresponds to U.S. Appl. No. 11/850,015.

Office Action dated Mar. 1, 2011, received in U.S. Appl. No. 11/969,796.

Office Action dated Apr. 1, 2010, received in Australian Patent Application No. 2008204988, which corresponds to U.S. Appl. No. 11/969,796.

Notice of Acceptance dated Apr. 7, 2011, received in Australian Patent Application No. 2008204988, which corresponds to U.S. Appl. No. 11/969,796.

Office Action dated Jun. 8, 2011, received in Chinese Patent Application No. 200880007119.4, which corresponds to U.S. Appl. No. 11/969,796.

Office Action dated Jun. 28, 2011, received in European Application No. 08 727 399.1, which corresponds to U.S. Appl. No. 11/969,796.

Office Action dated Jan. 24, 2011, received in Korean Patent Application No. 10-2009-7016497, which corresponds to U.S. Appl. No. 11/969,796.

Office Action dated Mar. 10, 2011, received in Chinese Patent Application No. 200780040508.2, which corresponds to U.S. Appl. No. 11/850,015.

Decision to Grant dated Mar. 24, 2011, received in European Patent Application No. 07814691.7, which corresponds to U.S. Appl. No. 11/850,015.

Office Action dated Jan. 17, 2011, received in Korean Patent Application No. 10-2009-7007039, which corresponds to U.S. Appl. No. 11/850,015.

Notice of Acceptance dated Jan. 4, 2011, received in Australian Patent Application No. 2006291338, which corresponds to U.S. Appl. No. 11/228,737.

Office Action dated Mar. 22, 2011, received in Japanese Patent Application No. 2008531104, which corresponds to U.S. Application No. 11/228,737.

Office Action dated Nov. 26, 2009, received in Korean Application No. 10 2008 7006392, which corresponds to U.S. Appl. No. 11/228,737.

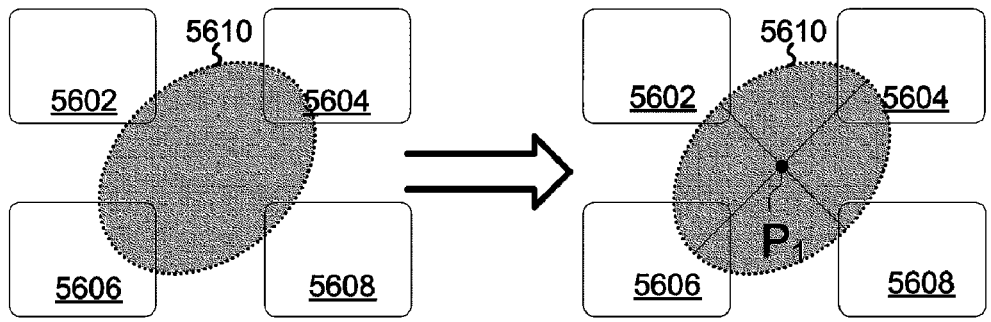
Figure 6A    Figure 6B
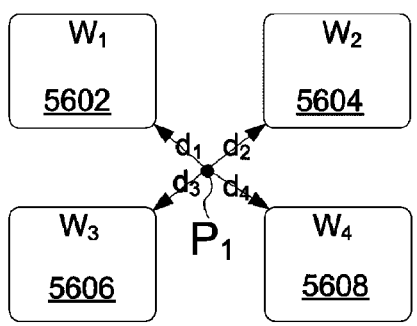
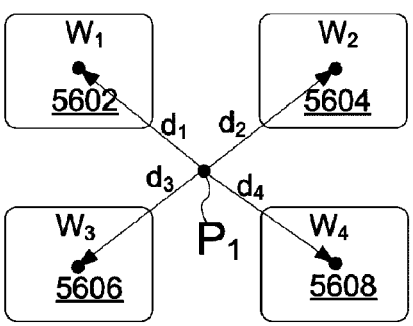
Figure 6C    Figure 6D
W$_1$' and W$_1$" are two numbers with opposite signs
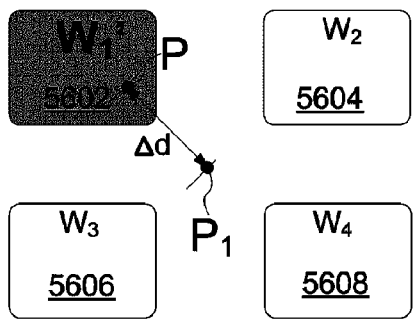
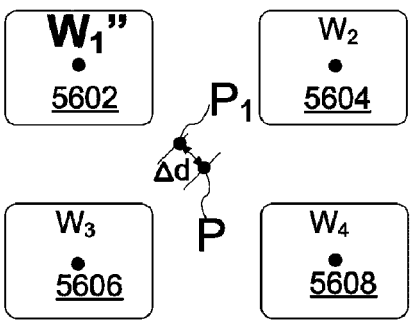
Figure 6E    Figure 6F

METHODS FOR DETERMINING A CURSOR POSITION FROM A FINGER CONTACT WITH A TOUCH SCREEN DISPLAY

RELATED APPLICATIONS

This application is a continuation of U.S. patent application Ser. No. 11/850,015, filed Sep. 4, 2007, now U.S. Pat. No. 7,843,427, which claims priority to U.S. Provisional Patent Application Nos. 60/937,993, "Portable Multifunction Device," filed Jun. 29, 2007; 60/946,716, "Methods for Determining a Cursor Position from a Finger Contact with a Touch Screen Display," filed Jun. 27, 2007; 60/879,469, "Portable Multifunction Device," filed Jan. 8, 2007; 60/879,253, "Portable Multifunction Device," filed Jan. 7, 2007; and 60/824,769, "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. patent application Ser. No. 11/228,737, "Activating Virtual Keys of a Touch-Screen Virtual Keyboard," filed Jul. 30, 2004. All of these applications are incorporated by reference herein.

TECHNICAL FIELD

The disclosed embodiments relate generally to portable electronic devices, and more particularly, to portable devices that adaptively determine a cursor position from a finger contact with a touch screen display and then perform operations according to the cursor position.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

To improve usability, some portable devices use a touch screen to render virtual push buttons such as soft keyboards and dial pads. From a user's finger contact with the virtual push buttons, a portable device determines the service(s) requested by the user and takes actions accordingly. But because different users often have different shapes of fingerprints, it has been a challenge for these portable devices to accurately and adaptively identify a user-desired virtual push button based on the different shapes of fingerprints and different contexts associated with different services supported by a portable device.

Accordingly, there is a need for portable multifunction devices that are configured to adaptively determine a cursor position from a finger contact with a touch screen and then perform operations according to the cursor position. Such configuration increases the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

One aspect of the invention involves a computer-implemented method performed by a portable multifunction device with a touch screen display. The portable device detects a contact area of a finger with the touch screen display and then determines a first position associated with the contact area. The cursor position of the finger contact is determined, at least in part, based on: the first position, one or more distances between the first position and one or more of the user interface objects; and one or more activation susceptibility numbers, each associated with a respective user interface object in the plurality of user interface objects.

Another aspect of the invention involves a graphical user interface on a portable multifunction device with a touch screen display. The graphical user interface includes a cursor and a plurality of user interface objects. The cursor's position is determined, at least in part, based on: a first position associated with a contact area of a finger with the touch screen display, one or more distances between the first position and one or more of the user interface objects, and one or more activation susceptibility numbers, each associated with a respective user interface object in the plurality of user interface objects.

Another aspect of the invention involves a portable electronic device with a touch screen display with a plurality of user interface objects. The device includes one or more processors, memory, and a program stored in the memory and configured to be executed by the one or more processors. The program includes: instructions for detecting a contact area of a finger with the touch screen display, instructions for determining a first position associated with the contact area, and instructions for determining a cursor position, at least in part, based on: the first position, one or more distances between the first position and one or more of the user interface objects, and one or more activation susceptibility numbers, each associated with a respective user interface object in the plurality of user interface objects.

Another aspect of the invention involves a computer-program product that includes a computer readable storage medium and a computer program mechanism (e.g., one or more computer programs) embedded therein. The computer program mechanism includes instructions that, when executed by a portable electronic device, cause the device to: detect a contact area of a finger with the touch screen display; determine a first position associated with the contact area; and determine a cursor position, at least in part, based on: the first position, one or more distances between the first position and one or more of the user interface objects, and one or more activation susceptibility numbers, each associated with a respective user interface object in the plurality of user interface objects.

Another aspect of the invention involves a portable electronic device with a touch screen display. The device includes: means for detecting a contact area of a finger with the touch screen display; means for determining a first position associated with the contact area; and means for determining a cursor position, at least in part, based on: the first position, one or more distances between the first position and one or more of the user interface objects, and one or more activation susceptibility numbers, each associated with a respective user interface object in the plurality of user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6L illustrate exemplary methods for determining a cursor position on a touch screen display in accordance with some embodiments.

DESCRIPTION OF EMBODIMENTS

Figure 1A:
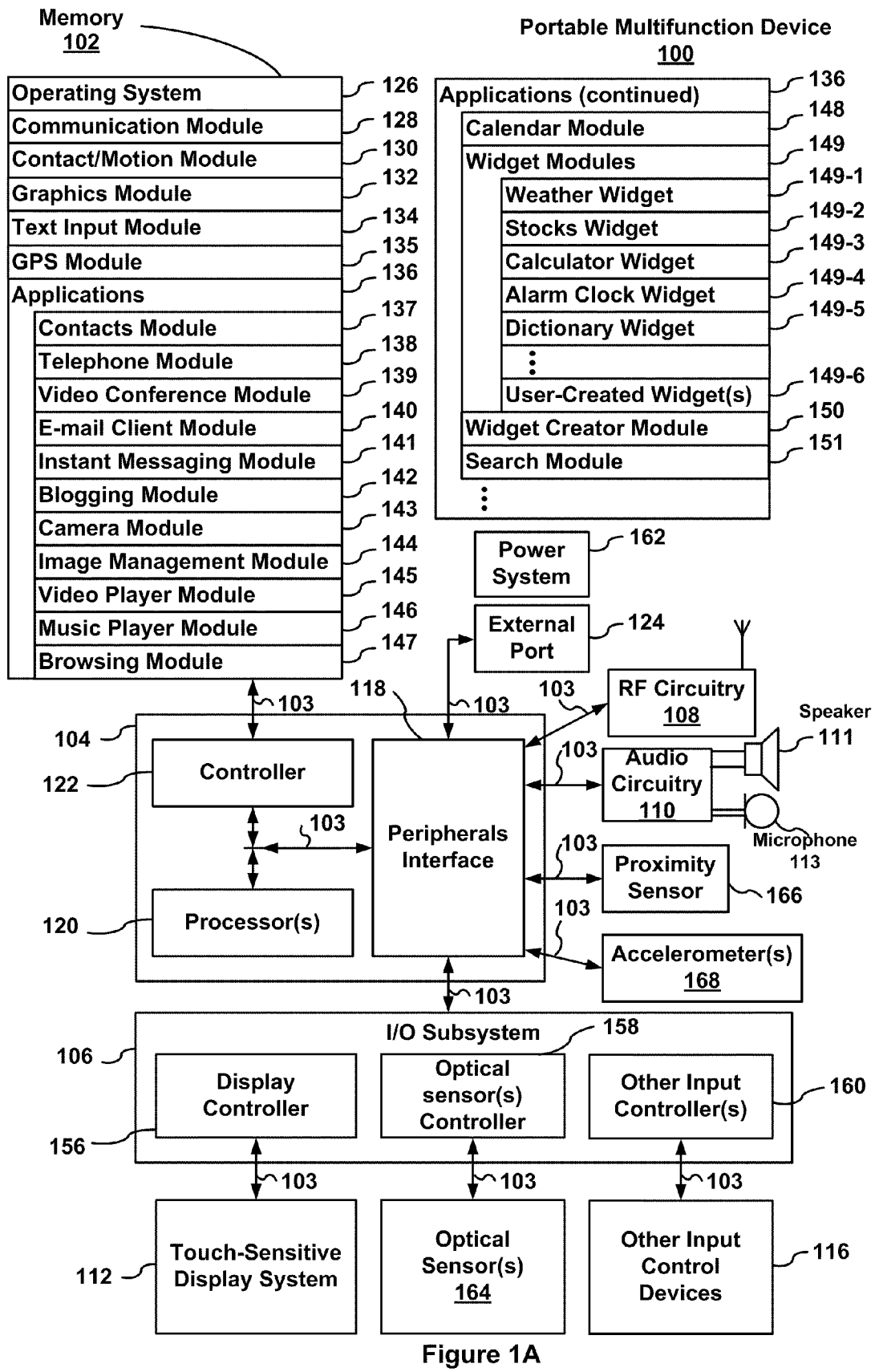
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
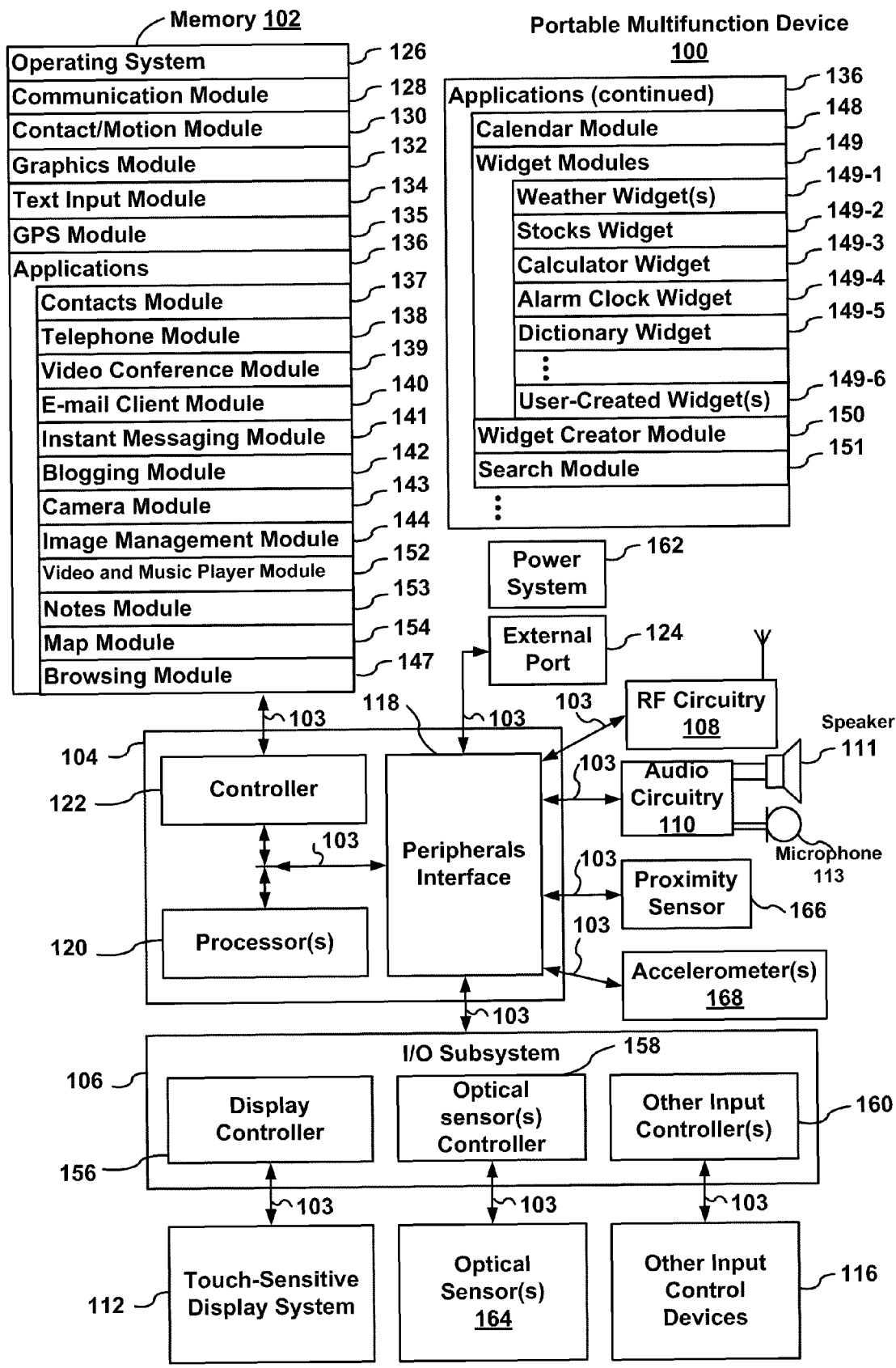

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HS-DPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, filed Jan. 7, 2007, "Using Ambient Light Sensor To Augment Proximity Sensor Output,"; Ser. No. 11/586,862, filed Oct. 24, 2006, "Automated Response To And Sensing Of User Activity In Portable Devices,"; and Ser. No. 11/638,251, filed Dec. 12, 2006, "Methods And Systems For Automatic Configuration Of Peripherals," which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files.

In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
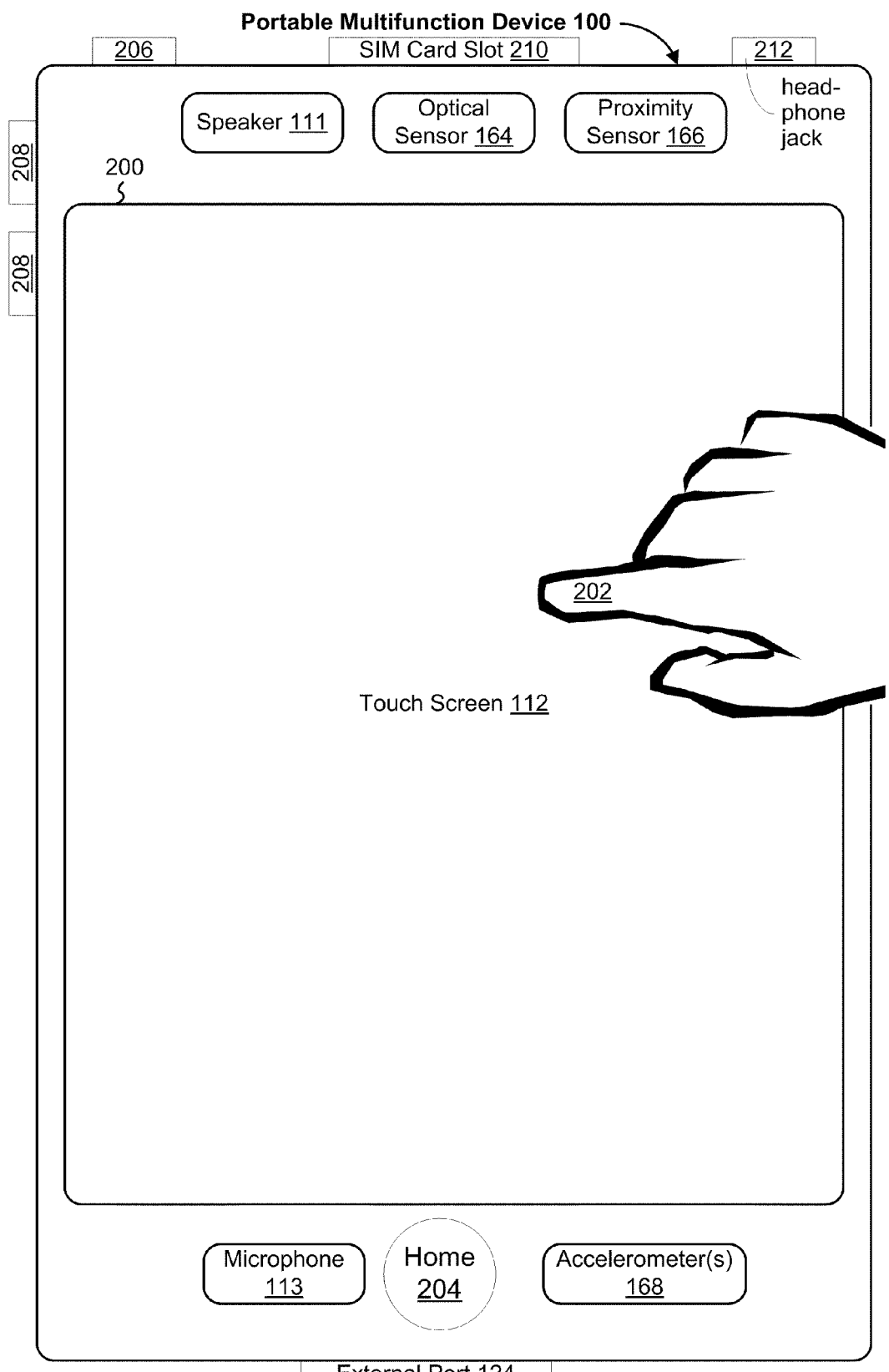
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
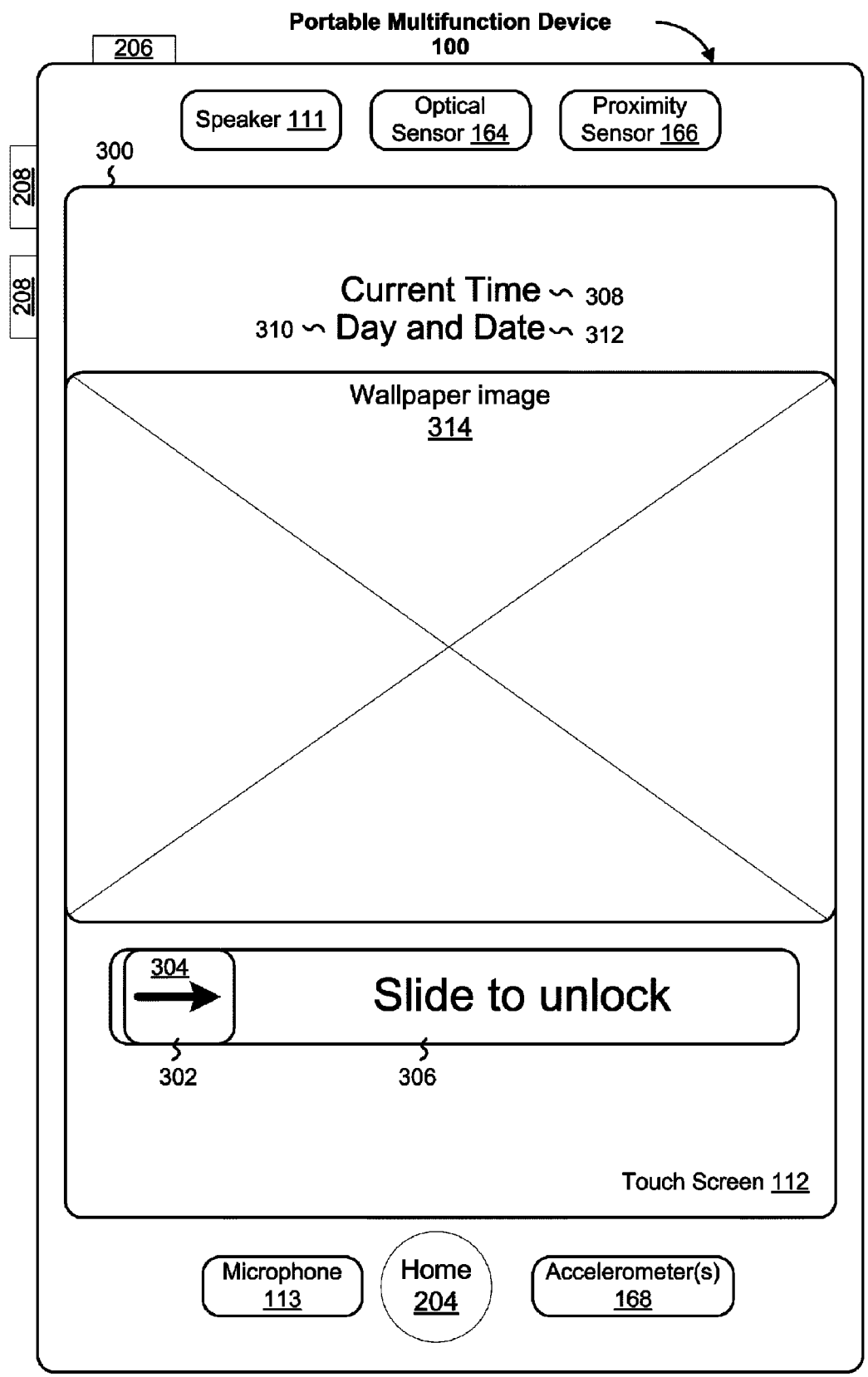
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;

Channel 306 that provides additional cues to the unlock gesture;

Time 308;

Day 310;

Date 312; and

Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference.

Figure 4A:
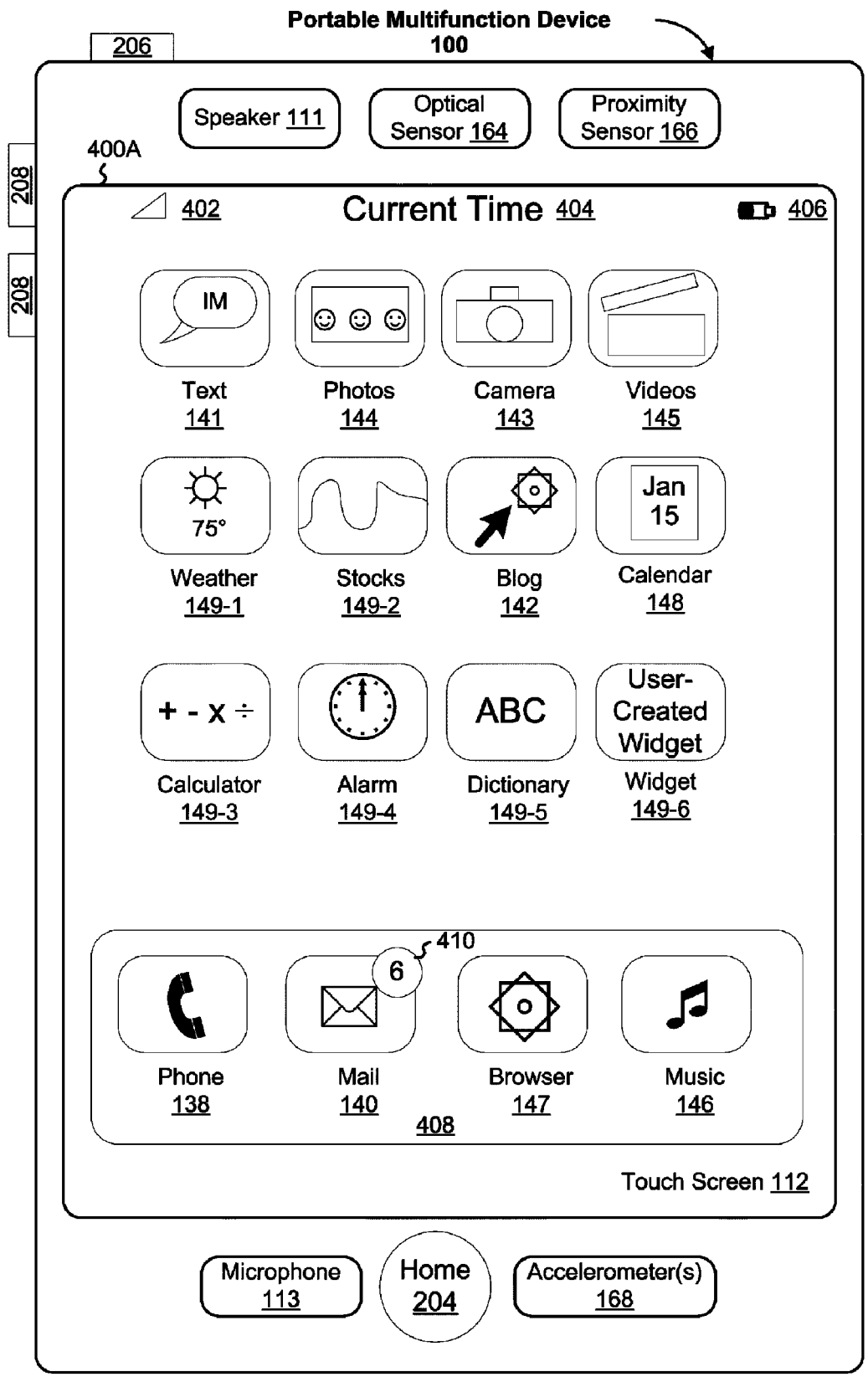
FIGS. 4A and 4B illustrate exemplary user interfaces for a menu of applications on a portable multifunction device in accordance with some embodiments.
Figure 4B:
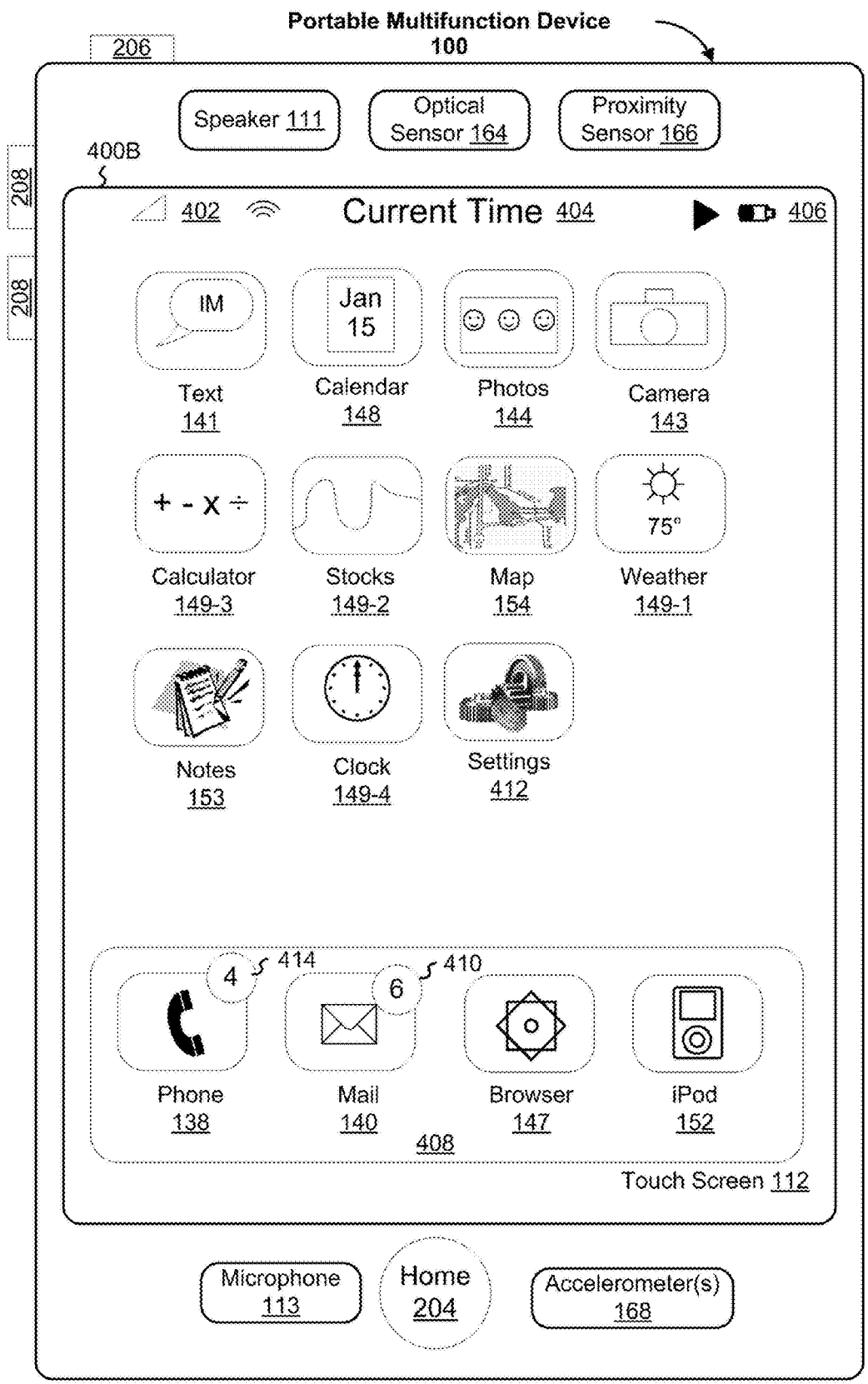
Figure 5:
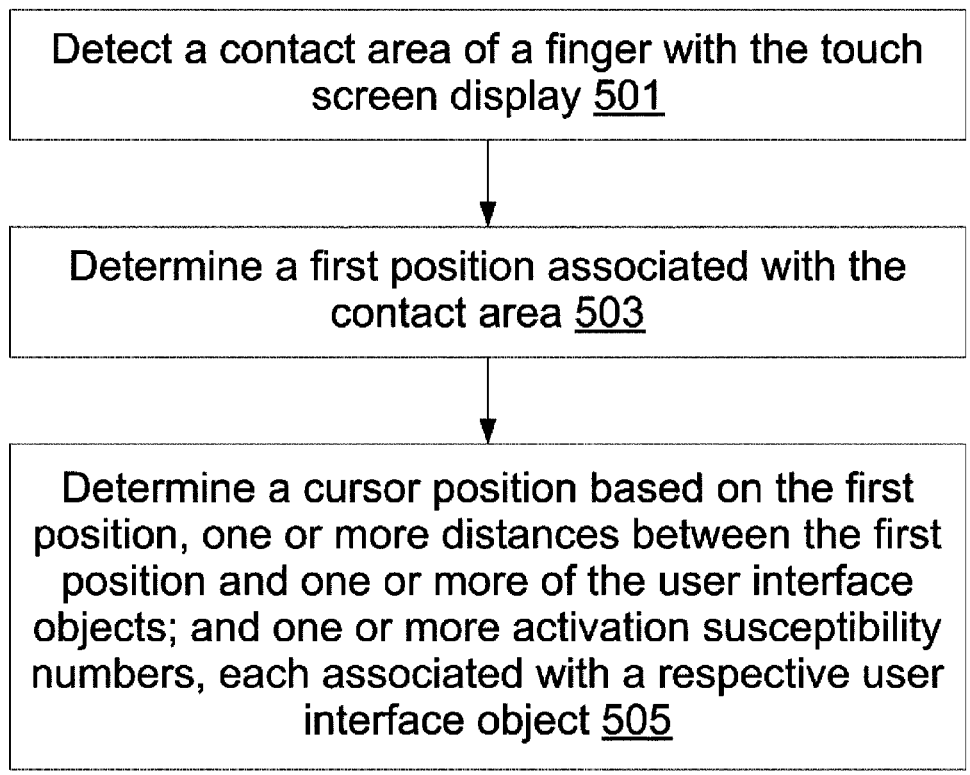
FIG. 5 is a flow diagram illustrating a process for determining a cursor position from a finger contact with a touch screen in accordance with some embodiments.

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;

Time 404;

Battery status indicator 406;

Tray 408 with icons for frequently used applications, such as one or more of the following:

Phone 138, which may include an indicator 414 of the number of missed calls or voicemail messages;

E-mail client 140, which may include an indicator 410 of the number of unread e-mails;

Browser 147; and

Music player 146; and

Icons for other applications, such as one or more of the following:

IM 141;

Image management 144;

Camera 143;

Video player 145;

Weather 149-1;

Stocks 149-2;

Blog 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136; and Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

As noted above in the background section, a challenge for a portable device with a touch screen is how to accurately translate a 2-D finger contact area on the touch screen information a unique 1-D cursor position.

A finger contact with the touch screen display (e.g., a finger tap) is a process involving multiple actions including the finger approaching the display, the finger being in contact with the display, and the finger leaving the display. During this process, the finger's contact area increases from zero to a maximum contact area and then reduces to zero. In some embodiments, for a stationary finger contact with the display, its finger contact area is defined as the maximum contact area of the finger with the touch screen display during a time period corresponding to the stationary contact.

FIGS. 5 and 6A-6L illustrate exemplary methods for determining a cursor position from a finger contact with a touch screen in accordance with some embodiments.

As shown in FIG. 6A, the touch screen display displays multiple user interface objects 5602-5608. Exemplary user interface objects include an open icon, a close icon, a delete icon, an exit icon, or soft key icons. Some of these icons may be deployed within a small region on the touch screen display such that one icon is very close to another icon.

When there is a finger contact with the touch screen display, unlike the conventional mouse click, the finger has a certain contact area (e.g., 5610 in FIG. 6A) on the touch screen display. In some embodiments, a cursor position corresponding to the finger's contact area 5610 with the touch screen display needs to be determined before any user interface object can be activated to perform a predefined operation.

After determining a finger contact area (501), the portable device determines a first position associated with the contact area 5610 (503). As will be explained below, the first position may or may not be the cursor position corresponding to the finger contact. But the first position will be used to determine the cursor position. In some embodiments, as shown in FIG. 6B, the first position $P_1$ is the centroid of the contact area 5610.

In some other embodiments (FIG. 6H), when a finger is in physical contact with the touch screen display, the finger has to press the display with the pressure varying from one position to another position within the contact area. Sometimes, the position $P_2$ at which a user applies the maximum pressure may not be the centroid $P_1$ of the contact area, although the maximum pressure position $P_2$ may be closer to the object that the user would like to select.

Figures 6G, 6H:
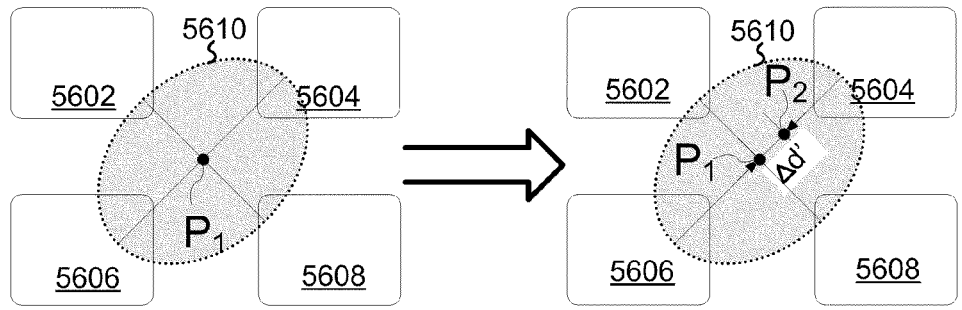

As shown in FIG. 6H, the contact area 5610 is deemed to be elliptical with a major axis and a minor axis perpendicular to the major axis. It is assumed that there is a fixed distance $\Delta d'$ between the centroid $P_1$ of the contact area 5610 and the corresponding maximum pressure position $P_2$. In this case, the first position or the maximum pressure position $P_2$ can be determined from $P_1$ and $\Delta d'$.

Figures 6I, 6J:
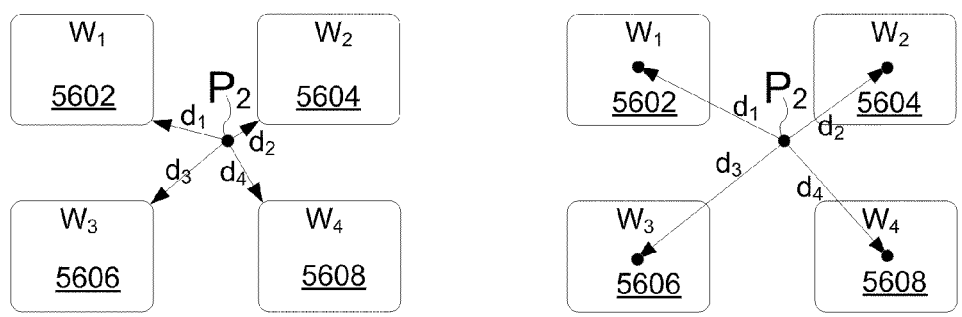

The cursor position P of the finger contact is determined based on one or more parameters (505), including the location of the first position, i.e., $P_1$ in FIG. 6B or $P_2$ in FIG. 6H, one or more distances between the first position and one or more user interface objects near the first position, and, in some embodiments, one or more activation susceptibility numbers associated with the user interface objects (e.g., $W_1$-$W_4$ in FIG. 6C or FIG. 6I).

In some embodiments, as shown in FIGS. 6C and 6I, the distance between the first position ($P_1$ in FIG. 6C or $P_2$ in FIG. 6I) and a respective user interface object (5602, 5604, 5606, or 5608) is the distance between the first position and a point on the user interface object that is closest to the first position.

In some other embodiments, as shown in FIGS. 6D and 6J, the distance between the first position ($P_1$ in FIG. 6D or $P_2$ in FIG. 6J) and a user interface object (5602, 5604, 5606, or 5608) is the distance between the first position and the center of the user interface object.

In some embodiments, the offset between the cursor position and the first position (e.g., $\Delta d$ in FIGS. 6E and 6F) is given by the formula as follows:

$$\Delta \vec{d} = \sum_i \Delta \vec{d}_i = \sum_i \frac{W_i}{d_i^n} \vec{u}_i,$$

where:

$\Delta \vec{d}$ is the offset between the cursor position P and the first position $P_1$, $\Delta \vec{d}_i$ is an offset component associated with a user interface object I along the direction between the first position and the user interface object i, $W_i$ is an activation susceptibility number associated with the user interface object i, $d_i$ is a distance between the first position and the user interface object i, n is a real number (e.g., 1), and $\vec{u}_i$ is a unit vector along the direction of $\Delta \vec{d}_i$.

If the determined cursor position P is on a particular user interface object (e.g., 5602 in FIG. 6E), the user interface object is activated to perform a predefined operation such as playing a song, deleting an email message, or entering a character to an input field.

In some embodiments, the activation susceptibility numbers assigned to different user interface objects have different values and signs depending on the operation associated with each object.

For example, as shown in FIG. 6E, if the operation associated with the user interface object 5602 is reversible or otherwise non-destructive (e.g., the user interface object 5602 is the play icon of the music and video player module 146), an activation susceptibility number $W_1'$ having a first sign (e.g., "+") is assigned to the object 5602 such that the determined cursor position P is drawn closer to the object 5602 than the first position $P_1$, rendering the object 5602 easier to be activated. In this context, "non-destructive" is defined to mean an action that will not cause a permanent loss of information.

In contrast, as shown in FIG. 6F, if the operation associated with the user interface object 5602 is irreversible or destructive of user information (e.g., the user interface object 5602 is the delete icon of the mail module 140), an activation susceptibility number $W_1''$ having a second sign (e.g., "−") opposite to the first sign is assigned to the object 5602 such that the determined cursor position P may be further away from the object 5602 than the first position $P_1$, rendering the object 5602 harder to activate. Thus, when an object's associated activation susceptibility number has the second sign, the contact must be relatively precisely positioned over the object in order to activate it, with larger values of the activation susceptibility number corresponding to higher degrees of precision.

Figures 6K, 6L:
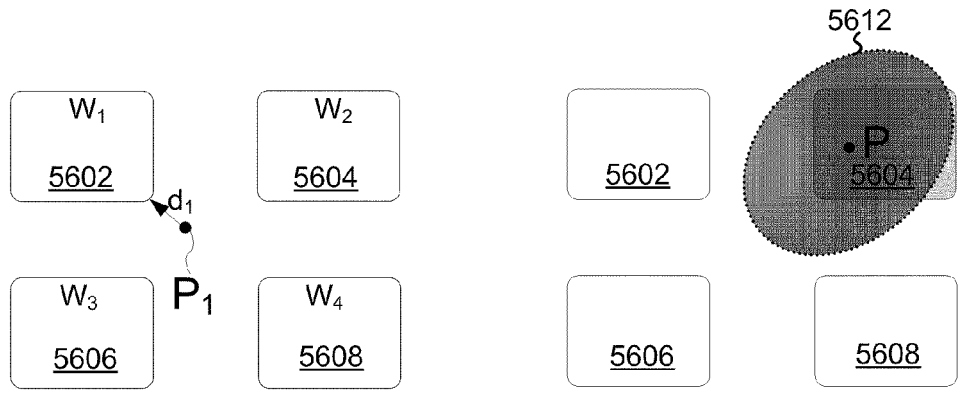

In some embodiments, the cursor position P is determined based on the first position, the activation susceptibility number associated with a user interface object that is closest to the first position, and the distance between the first position and the user interface object that is closest to the first position. In these embodiments, the cursor position P is not affected by the parameters associated with other neighboring user interface objects. For example, as shown in FIG. 6K, the first position $P_1$ is closest to the user interface object 5602 that has an associated activation susceptibility number $W_1$. The distance between the first position $P_1$ and the object 5602 is $d_1$. The cursor position P to be determined is only affected by these parameters, not by other neighboring user interface objects 5604, 5606 or 5608.

In some embodiments, when one or more user interface objects fall within a predefined distance of the first position, the cursor position P is determined based on the first position, and the activation susceptibility numbers associated with each user interface object falls within the predefined distance, and the distance between the first position and each of those user interface objects. Alternately, in some embodiments, when one or more user interface objects fall within the contact area of the user's finger contact with the touch screen display (or within a predefined distance of the contact area), the cursor position P is determined based on the first position, and the activation susceptibility numbers associated with each user interface object that falls within the contact area (or with the predefined distance of the contact area), and the distance between the first position and each of those user interface objects.

In some embodiments, as shown in FIG. 6L, the cursor position is the same as the first position, which may be $P_1$ in FIG. 6B or $P_2$ in FIG. 6H, if the first position is within a particular user interface object (e.g., 5604) on the display. In this case, there is no need to further offset the cursor position from the first position.

In some embodiments, as shown in FIG. 6E, a finger contact does not have to occur exactly at an object to activate the object. Rather, the user interface object is activated as long as the determined cursor position falls within the user interface object. In some embodiments, a user interface object is activated if the determined cursor position falls within a user interface object's "hit region." The hit region of a user interface object may be the same size as, or larger, or smaller, than the user interface object itself. User interface objects that cause irreversible or destructive changes to data will typically have a hit region that is the same size as, or smaller than, the user interface object itself. In some embodiments, at least some user interface objects that do not cause irreversible or destructive changes to data have a hit region that is larger than those user interface objects. For such objects, the portion of the hit region that is larger than the corresponding user interface object may be called a hidden hit region.

In some embodiments, at least some of the user interface objects involved in determining the cursor position in the formula above are visible on the touch screen display.

In some embodiments, the activation susceptibility numbers associated with the user interface objects (e.g., $W_1$-$W_4$) are context-dependent in a specific application module and change from one context to another context within the specific application module. For example, an object may have a first activation susceptibility number that is attractive to a cursor position at a first moment (in a first context of a specific application module), but a second activation susceptibility number that is less attractive or even repulsive (e.g., if the second activation susceptibility number has an opposite sign) to the cursor position at a second moment (in a second context of the specific application module).

Figure 6M:
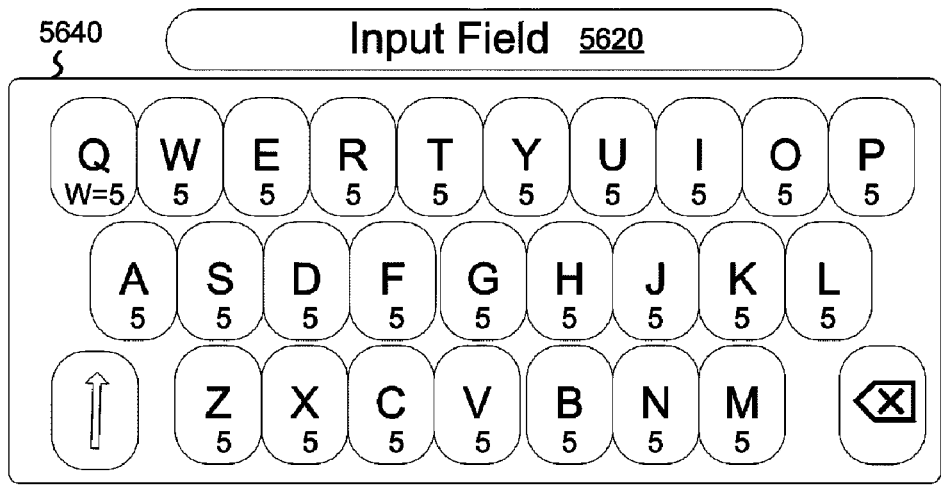
FIGS. 6M-6O illustrate an exemplary method for dynamically adjusting susceptibility numbers associated with soft keyboard keys as a word is typed with the soft keyboard keys in accordance with some embodiments.
Figure 6N:
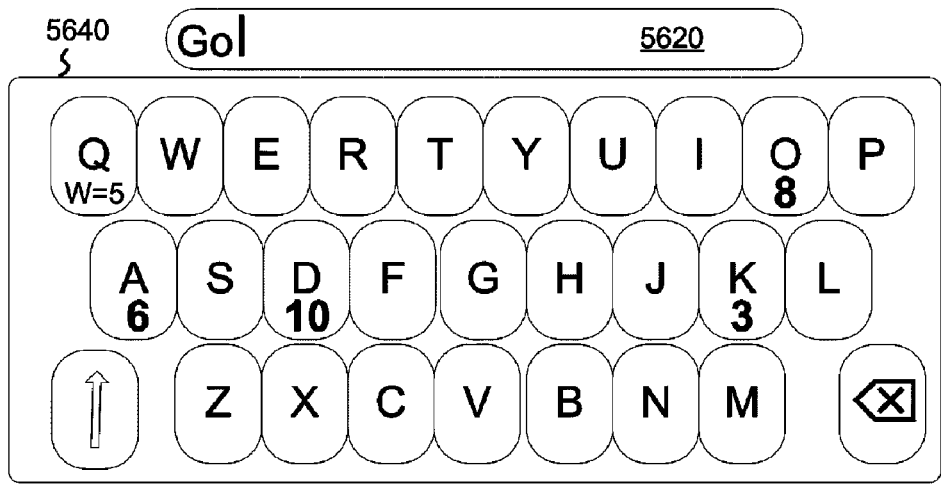
Figure 6O:
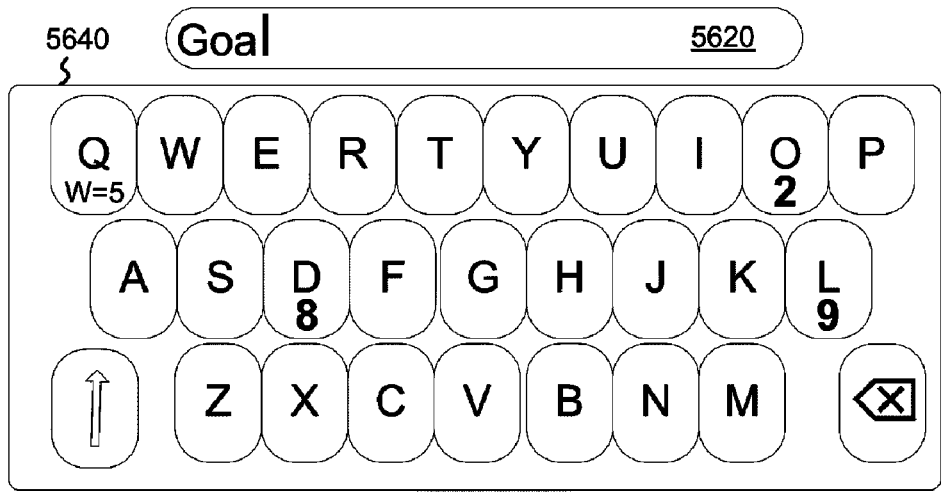

FIGS. 6M-6O illustrate an exemplary method for dynamically adjusting activation susceptibility numbers associated with soft keyboard keys as a word is typed with the soft keyboard keys in accordance with some embodiments. The user interface includes an input field 5620 and a soft keyboard 5640. A user selection of any key icon of the soft keyboard 5640 enters a corresponding user-selected character in the input field 5620. For illustrative purposes, as shown in FIG. 6M, all the key icons initially have the same activation susceptibility number, 5.

FIG. 6N depicts the activation susceptibility numbers associated with different key icons after two characters "Go" are entered into the input field 5620. The activation susceptibility numbers associated with the key icons have been adjusted in accordance with the previously entered characters. For example, the activation susceptibility number of key icon "D" changes from 5 to 10 because "God" is a common English word. Thus, the key icon "D" may be activated even if the next finger contact is closer to the key icon "F" than to the key icon "D" itself. Similarly, the activation susceptibility numbers associated with key icons "A" and "O" are also increased because each of the strings "Goa" and "Goo" leads to one or more legitimate English words such as "Goal", "Good", or "Goad." In contrast, the activation susceptibility number of key icon "K" drops to 3 because the string "Gok" is not found at the beginning of any common English words.

FIG. 6O depicts the updated activation susceptibility numbers associated with different key icons after another character "a" is entered into the input field 5620. Given the string "Goa" that has been entered, the user may be typing the word "Goal." Accordingly, the activation susceptibility number associated with the key icon "L" increases to 9 whereas the activation susceptibility number associated with the key icon "O" drops to 2 because the string "Goao" is not found at the beginning of any common English words.

In sum, a cursor position for a finger contact with the touch screen display is adjusted at least in part based on the activation susceptibility numbers (or weights) assigned to user interface objects. Such cursor position adjustment helps to reduce the chance of selecting a user interface object by mistake.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
a touch screen display;
one or more processors;
memory; and
one or more programs, wherein the one or more programs are stored in the memory and configured to be executed by the one or more processors, the one or more programs including instructions for:
displaying a plurality of user interface objects on the touch screen display;
detecting a contact area of a finger with the touch screen display;
determining a first position associated with the contact area; and
determining a cursor position point, at least in part, based on:
the first position,
one or more distances between the first position and one or more of the user interface objects; and
one or more activation susceptibility numbers, each associated with a respective user interface object in the plurality of user interface objects.

2. The device of claim 1, wherein, for a stationary contact of a finger with the display, the detected contact area corresponds to the maximum contact area of the finger with the display during a time period corresponding to the stationary contact.

3. The device of claim 1, wherein the contact area is elliptical with a major axis and the first position is offset from the centroid of the contact area along the major axis.

4. The device of claim 1, wherein a user interface object associated with an activation susceptibility number is easier to activate if the activation susceptibility number has a first sign and is harder to activate if the activation susceptibility number has a second sign opposite to the first sign.

5. The device of claim 1, wherein determining the cursor position point is based on:
the first position,
the activation susceptibility number associated with a user interface object that is closest to the first position, and
the distance between the first position and the user interface object that is closest to the first position.

6. The device of claim 1, wherein the cursor position point is offset from the first position by an amount given by the formula $$\Delta \vec{d} = \sum_i \Delta \vec{d}_i = \sum_i \frac{W_i}{d_i^n} \vec{u}_i,$$

where:
$\Delta \vec{d}$ is the offset, $\Delta \vec{d}_i$ is an offset component associated with a user interface object i, wherein $\Delta \vec{d}_i$ is along the direction between the first position and the user interface object i, $W_i$ is a activation susceptibility number associated with the user interface object i, $d_i$ is a distance between the first position and the user interface object i, n is a real number, and $\vec{u}_i$ is a unit vector along the direction of $\Delta \vec{d}_i$.

7. The device of claim 1, wherein the cursor position point is the first position if the first position is within one of the plurality of user interface objects on the display.

8. The device of claim 1, further comprising instructions for activating a user interface object at the cursor position point.

9. The device of claim 1, wherein the activation susceptibility numbers are context dependent in an application.

10. The device of claim 1, wherein activation susceptibility numbers associated with soft keyboard keys change as a word is typed with the soft keyboard keys.

11. A computer readable storage medium storing one or more programs, the one or more programs comprising instructions, which when executed by a portable electronic device with a touch screen display, cause the portable electronic device to:
   display a plurality of user interface objects on the touch screen display;
   detect a contact area of a finger with the touch screen display;
   determine a first position associated with the contact area; and
   determine a cursor position point, at least in part, based on:
      the first position,
      one or more distances between the first position and one or more of the user interface objects; and
      one or more activation susceptibility numbers, each associated with a respective user interface object in the plurality of user interface objects.

12. The computer readable storage medium of claim 11, wherein, for a stationary contact of a finger with the display, the detected contact area corresponds to the maximum contact area of the finger with the display during a time period corresponding to the stationary contact.

13. The computer readable storage medium of claim 11, wherein the contact area is elliptical with a major axis and the first position is offset from the centroid of the contact area along the major axis.

14. The computer readable storage medium of claim 11, wherein a user interface object associated with an activation susceptibility number is easier to activate if the activation susceptibility number has a first sign and is harder to activate if the activation susceptibility number has a second sign opposite to the first sign.

15. The computer readable storage medium of claim 11, wherein determining the cursor position point is based on:
   the first position,
   the activation susceptibility number associated with a user interface object that is closest to the first position, and
   the distance between the first position and the user interface object that is closest to the first position.

16. The computer readable storage medium of claim 11, wherein the cursor position point is offset from the first position by an amount given by the formula $$\Delta \vec{d} = \sum_i \Delta \vec{d}_i = \sum_i \frac{W_i}{d_i^n} \vec{u}_i,$$

where:

$\Delta \vec{d}$ is the offset, $\Delta \vec{d}_i$ is an offset component associated with a user interface object i, wherein $\Delta \vec{d}_i$ is along the direction between the first position and the user interface object i, $W_i$ is a activation susceptibility number associated with the user interface object i, $d_i$ is a distance between the first position and the user interface object i, n is a real number, and $\vec{u}_i$ is a unit vector along the direction of $\Delta \vec{d}_i$.

17. The computer readable storage medium of claim 11, wherein the cursor position point is the first position if the first position is within one of the plurality of user interface objects on the display.

18. The computer readable storage medium of claim 11, further comprising instructions that cause the device to activate a user interface object at the cursor position point.

19. The computer readable storage medium of claim 11, wherein the activation susceptibility numbers are context dependent in an application.

20. The computer readable storage medium of claim 11, wherein activation susceptibility numbers associated with soft keyboard keys change as a word is typed with the soft keyboard keys.

21. A method, comprising:
   at a portable electronic device with a touch screen display:
      displaying a plurality of user interface objects on the touch screen display;
      detecting a contact area of a finger with the touch screen display;
      determining a first position associated with the contact area; and
      determining a cursor position point, at least in part, based on:
      the first position,
         one or more distances between the first position and one or more of the user interface objects; and
         one or more activation susceptibility numbers, each associated with a respective user interface object in the plurality of user interface objects.

* * * * *